UNITED STATES PATENT OFFICE.

BENJAMIN GRATZ AND ANDERSON GRATZ, OF ST. LOUIS, MISSOURI.

PROCESS OF MAKING JUTE BAGGING.

SPECIFICATION forming part of Reissued Letters Patent No. 11,205, dated December 1, 1891.

Original No. 432,401, dated July 15, 1890. Application for reissue filed October 10, 1891. Serial No. 408,367.

*To all whom it may concern:*

Be it known that we, BENJAMIN GRATZ and ANDERSON GRATZ, both of the city of St. Louis, in the State of Missouri, have invented a certain new and useful Improvement in the Process of Manufacturing Bagging from Jute-Butts, of which the following is a full, clear, and exact description.

It has been customary for many years to manufacture bagging from jute-stalks, and bagging has also been made to a limited extent from jute-butts; but this article is of a very dark coarse nature and very dissimilar to bagging made of jute-stalks, in that the latter is much lighter in color, and therefore much more desirable. The bagging made from butts is used almost exclusively for inclosing baled cotton, and it has to be produced and placed upon the market at a very low price.

The object of our present invention is to produce a bagging from jute-butts which will be far superior to the bagging heretofore made from this article, in that it is lighter in color and much superior in appearance to the old article.

It has been common for many years to treat fabrics with different chemicals, including chloride of sodium, for the purpose of rendering them fire-proof. The only methods of treating such fabrics, so far as we are aware, has been by steeping or boiling the fabrics in a chloride of sodium or other chemical solution; but this method would be wholly impracticable in the manufacture of bagging from jute-butts, owing to the great bulk of the material to be handled and the very cheap way in which the goods must be made. The total expense of manufacturing bagging from jute-butts does not exceed one cent per pound, while the total labor expense should not exceed three-quarters of one cent per pound, and if the bagging were steeped or saturated with the chloride of sodium it would cost at least one-quarter of one cent per pound to sufficiently dry it for storing for use, and this additional cost would add so materially to the cost of the product as to interfere very much with the use of jute-butts as an article from which bagging could be practically made.

In practicing our invention we use chloride of sodium, and to avoid this soaking or steeping of the product we have conducted many experiments in applying the solution of chloride of sodium in the different processes of manufacturing this coarse bagging from jute-butts, and after many trials have discovered and adopted the plan of sprinkling the cloth with a solution of chloride of sodium, being careful not to put on enough to rot the cloth when stored, and also being careful to put on enough to bleach the cloth by chemical action when it is rolled into tight packages and put away in a damp condition. We prefer to apply the solution to the goods after weaving and while the goods are on the calenders. By applying it at this time the chloride of sodium does not come in contact with the spinning and weaving machinery, which would cause them to rust, and by applying it while the goods are on the calender and just before being rolled up a very thorough and even distribution of the solution of chloride of sodium through the goods is obtained. As before stated, the rolls are stored away as they come from the calender in a damp condition, produced by the application of the solution of chloride of sodium, and the result is that a chemical action takes place in the tightly-rolled goods, which very materially improves the color of the article and adds much to its value, but practically nothing to the cost of its production. We are thus enabled to produce a very much higher grade of bagging than it has been possible heretofore to produce from jute-butts.

As an example of a suitable solution per fifty yards of the fabric, we would state that two and a half pounds of chloride of sodium dissolved in seven and a half pounds of water has been found to give good results.

We claim as our invention—

1. The improved process of manufacturing bagging from jute-butts, consisting of first weaving the fabric, then applying a solution of chloride of sodium to the fabric, and then winding the fabric into rolls while still damp, substantially as set forth.

2. The improved process of bleaching fabric made from jute-butts, consisting in applying a solution of chloride of sodium and then storing the fabric away in mass while damp and allowing a chemical action to take place for the purpose of bleaching the fabric, substantially as set forth.

BENJAMIN GRATZ.
ANDERSON GRATZ.

Witnesses to signature of Benjamin Gratz:
E. S. KNIGHT,
A. M. EBERSOLE.

Witnesses to signature of Anderson Gratz:
W. W. CHILDS,
GEO. C. HOFFNER.